United States Patent
Chen

(10) Patent No.: US 6,787,405 B2
(45) Date of Patent: Sep. 7, 2004

(54) METHOD OF FABRICATING LIQUID CRYSTAL DISPLAY DEVICES INTEGRATED WITH DRIVING CIRCUIT

(75) Inventor: Hsin-Ming Chen, Hsinchu (TW)

(73) Assignee: Toppoly Optoelectronics Corp., Miao-Li County (TW)

(*) Notice: Subject to any disclaimer, the term of this patent is extended or adjusted under 35 U.S.C. 154(b) by 0 days.

(21) Appl. No.: 10/413,309

(22) Filed: Apr. 15, 2003

(65) Prior Publication Data

US 2004/0041954 A1 Mar. 4, 2004

(30) Foreign Application Priority Data

Sep. 3, 2002 (TW) ........................... 91120095 A

(51) Int. Cl.[7] .............................................. H01L 21/84
(52) U.S. Cl. ........................................ 438/154; 438/163
(58) Field of Search ......................... 438/30, 153, 154, 438/163, 275

(56) References Cited

U.S. PATENT DOCUMENTS

| | | | |
|---|---|---|---|
| 5,633,182 A | * 5/1997 | Miyawaki et al. | 438/30 |
| 5,940,151 A | * 8/1999 | Ha | 257/59 |
| 6,278,131 B1 | * 8/2001 | Yamazaki et al. | 257/59 |
| 6,306,694 B1 | * 10/2001 | Yamazaki et al. | 438/151 |
| 6,635,521 B2 | * 10/2003 | Zhang et al. | 438/154 |

* cited by examiner

Primary Examiner—Chandra Chaudhari
(74) Attorney, Agent, or Firm—Troxell Law Office PLLC

(57) ABSTRACT

A method of forming a liquid crystal display device with a pixel TFT, a bottom electrode of pixel capacitor CL, and a storage capacitor Cs in a pixel region, and an n-type TFT and a p-type TFT in a driving circuit region is disclosed. Firstly, a transparent conductive oxide layer, a metal layer and an n-type heavy doped silicon layer are sequentially formed on a glass substrate. Thereafter, a patterning step is performed to define some predefined regions for above devices. After an active layer and a gate oxide layer are formed in order on all patterned surfaces, another patterning step is done to form a first, a second, and a third preserved region, respectively, for a LDD region of the n type TFT, source/drain regions for the p type TFT and a LDD region for pixel TFT and Cs. Afterward, gate electrodes are formed for aforementioned TFT and an upper electrode for Cs. Subsequently, a blanket nLDD implant is performed. Thereafter, a p type source/drain implant is carried out using a photoresist pattern as a mask. After removing the photoresist pattern, a passivation layer is formed on all areas. Next an annealing is performed to active the implant impurities. Another patterning process is then performed to form contact by patterning the passivation layer and form the bottom electrode of CL by further patterning the n-type heavy doped silicon layer, and the metal layer.

12 Claims, 5 Drawing Sheets

METHOD OF FABRICATING LIQUID CRYSTAL DISPLAY DEVICES INTEGRATED WITH DRIVING CIRCUIT

BACKGROUND OF THE INVENTION

1. Field of the Invention

The present invention relates to a liquid crystal display (LCD) device, and more particularly to a polysilicon type LCD.

2. Description of the Prior Art

A liquid crystal display (LCD) is a flat panel display with characteristic of low power consumption. In comparison with a cathode ray tube (CRT) display of the same viewing size, what the liquid crystal display provided is much lower in occupied space and weight and without a curved panel problem. Hence, the popular of the liquid crystal display prompts the relates products being widely applied in various sorts of merchandises such as pocket calculators, electronic dictionaries, watches, mobile phones, portable notebooks, communication terminal, display panels, desk-top monitors and even high dpi (dots per inch) televisions (HDTV) etc. Consequently, the popularity of display and correlated products thereof seems promote the LCD to become the most brilliant star in the present century. Among various LCD display type, the most attractive type is TFT(thin film transistor)-LCD. Due to large viewing angle and high contrast characteristics, the TFT-LCD display of active type are better than those of a super-twisted nematic liquid crystal display (STN-LCD) of passive matrix type. Moreover, the TFT-LCD shows more rapid response time (such as several ms) than the STN-LCD does (such as several hundred milliseconds).

In a conventional LCD, an amorphous silicon (a—Si) has been a long term choice of material for a thin film transistor (TFT) to fabricate an LCD. However, a polysilicon substitute for the amorphous silicon for the TFT is become a trend due to the polysilicon has a higher carrier (electron or hole) mobility than the amorphous silicon. Additionally, the polysilicon TFT has extra benefits such as the driving circuit with complimentary metal-oxide-semiconductor (CMOS) TFT on the LCD panel can be formed simultaneously with the pixel fabrication. As a result of the above-mentioned, the switch performance of the polysilicon-type TFT-LCD is better than the amorphous-type silicon TFT-LCD.

Certainly, the polysilicon TFT-LCD is not perfect. For instance, when the TFT is at the off-state, often there is still a large drain leakage current. However, it can usually be overcome by the technique of a lightly doped drain (LDD) or a dual gate structure. The U.S. Pat. No. 5,940,151 invented by Yong-Min Ha etc. is one example.

The fabricating method of Ha's patent is briefly described as follows: Firstly, please refer to FIG. 1A, which is a plan view illustrating a pixel portion of a TFT-LCD. A signal line 40 and a scanning line 50 vertically intersect each other as shown in FIG. 1A, wherein the scanning line 50 is directly connected to a gate electrode 14 of the pixel TFT portion and the signal line 40 is connected to a source electrode 11S (as shown in FIG. 1B) at the pixel TFT. Storage capacitor electrodes 17 and 18 are connected to a drain electrode 11D of the pixel TFT. The upper electrode of the storage capacitor is connected to the outside of the pixel, that is, the contact region of the top capacitor electrode 18 is outside of the pixel. A pixel electrode 15 is also connected to the drain electrode 11D of the pixel TFT.

FIGS. 1B to 1E are cross-sectional views including a series of fabrication processes for a pixel (taken along line a—a' of FIG. 1A) and the drive circuit thereof. First of all, an n-type heavily doped silicon layer and a metal layer are sequentially formed on an insulating substrate 1000. Then, through a photolithography and an etching technique (a first photo mask), source and drain electrode regions 11S and 11D of the pixel TFT are defined wherein the drain region 11D includes a first storage capacitor electrode 17, and source and drain electrode regions 21S and 21D of the n-type TFT are also defined at the drive circuit. A silicon thin film is subsequently formed on the overall surface over the substrate. Thereafter, the silicon thin film is defined by a photolithography and an etching technique (a second photo mask) to form a predetermined region 10' for a channel 10 and a lightly doped drain (LDD) 12 of the pixel TFT and another predetermined region 20n' for a channel 20n and a lightly doped drain (LDD) 22 of a n-type TFT, wherein the defined silicon regions 10' and 20n' are superposed on the corresponding source/drain regions thereof to form electrical connections. Moreover, the silicon thin film is also defined to form the other predetermined region 20p' for a channel 20p and source/drain electrodes 23S, 23D of a p-type TFT.

Referring to FIG. 1C, an oxide layer and a gate metal layer are sequentially formed over the substrate. Then, a gate electrode 14, a storage capacitor dielectric layer 100 and a storage capacitor top electrode 18 of the pixel TFT are defined by a photolithographic and an etching technique (a third photo mask). Simultaneously, at the drive circuit portion, a gate electrode 24n of the n-type TFT and a gate electrode 24p of the p-type TFT are defined. Thereafter, n-type impurities are lightly doped into the substrate including the pixel TFT and the n-type TFT and the p-type TFT at the drive circuit.

Turning to the cross-sectional view shown in FIG. 1D, a photoresist pattern 63 is formed (a fourth photo mask) to cover the n-type TFT at the pixel and drive circuit portions and to bare the silicon thin film of the p-type TFT. Then, p-type conductive impurities are implanted to form source and drain electrodes 23S and 23D of the p-type TFT. Thereafter, the photoresist pattern 63 is removed. As shown in FIG. 1E, a passivation layer 300 is deposited on the overall surface over the substrate and then, contact holes are formed by a photolithography and an etching technique (a fifth photo mask) respectively at the pixel portion and the drive circuit portion. Thereafter, an ITO is deposited on the overall surface over the substrate including the passivation layer 300 and the contact holes. Finally, a pixel electrode 15 is defined by a photolithography and etching technique (a sixth photo mask) and connected to the storage capacitor and the pixel TFT, and simultaneously, a transparent conductive line 25 is formed for connecting the p-type TFT and the nN-type TFT at the drive circuit.

SUMMARY OF THE INVENTION

A method of forming a liquid crystal display device with a pixel TFT, a bottom electrode of pixel capacitor CL, and a storage capacitor Cs in a pixel region, and an n-type TFT and a p-type TFT in a driving circuit region is disclosed. Firstly, a transparent conductive oxide layer, a metal layer and an n-type heavy doped silicon layer are sequentially formed on a glass substrate. Thereafter, a patterning step is performed to define some predefined regions for above devices. After an un-doped active layer and a gate oxide layer are formed in order on all patterned surfaces, another patterning step is done to form a first, a second, and a third preserved region, respectively, for a LDD region of the n type TFT, source/drain regions for the p type TFT and a LDD region for pixel TFT and Cs. Afterward, gate electrodes are formed for aforementioned TFT and an upper electrode for Cs. Subsequently, a blanket nLDD implant is performed by implant n-type impurities into the active layer. Thereafter, a p type source/drain implant is carried out using a photoresist pattern as a mask. After removing the photoresist pattern, a passivation layer is formed on all areas. Next an annealing is performed to active the implant impurities. Another patterning process is then performed to form contacts for driving circuit and end terminal of pixel panel by patterning the passivation layer and form the bottom electrode of $C_L$ by further patterning the n-type heavy doped silicon layer, and the metal layer to expose the transparent conductive oxide layer.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1A:
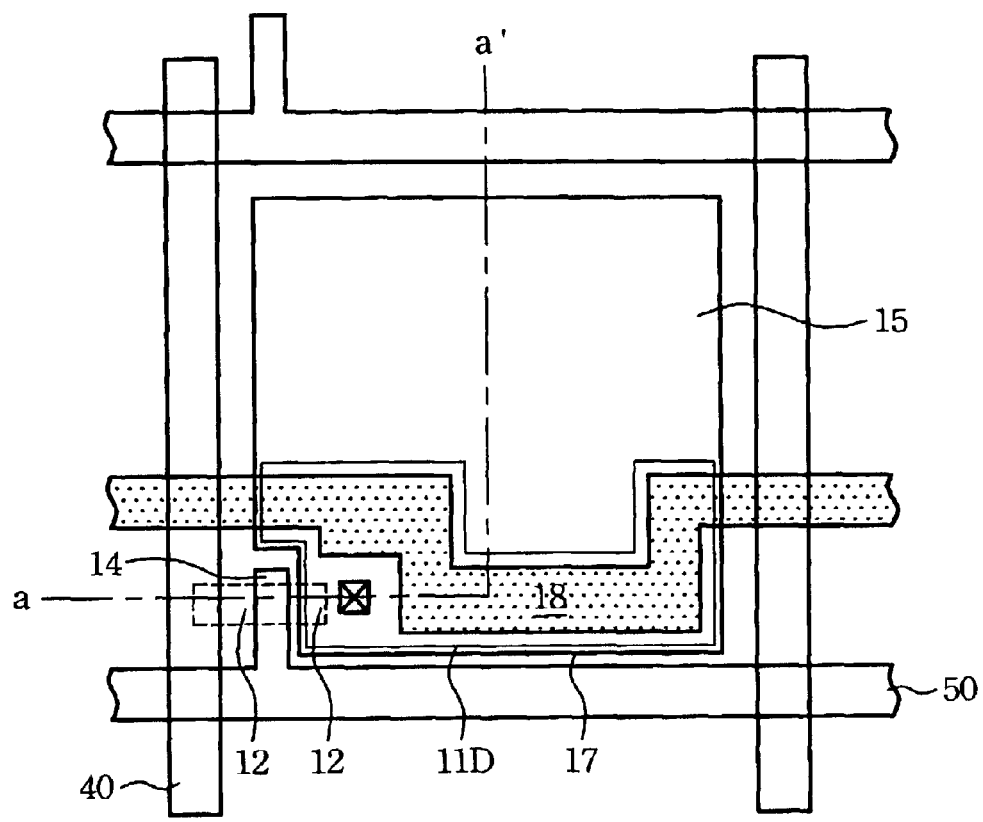
FIG. 1A is a top-view of one pixel of a TFT-LCD in accordance with the prior art.
Figure 1B:
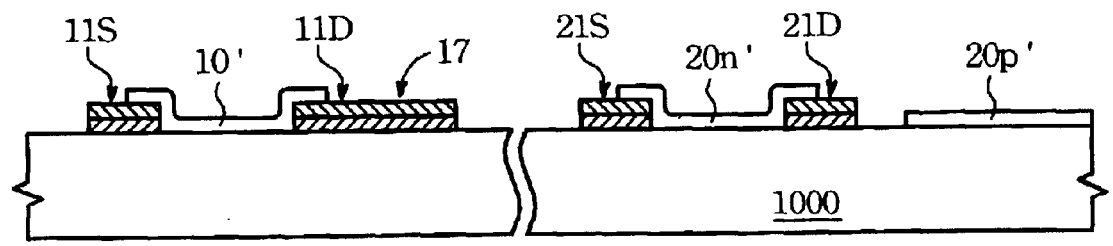
FIG. 1B to FIG. 1E are a series of cross-sectional views of fabricating processes for a TFT-LCD in accordance with the prior art.
Figure 1C:
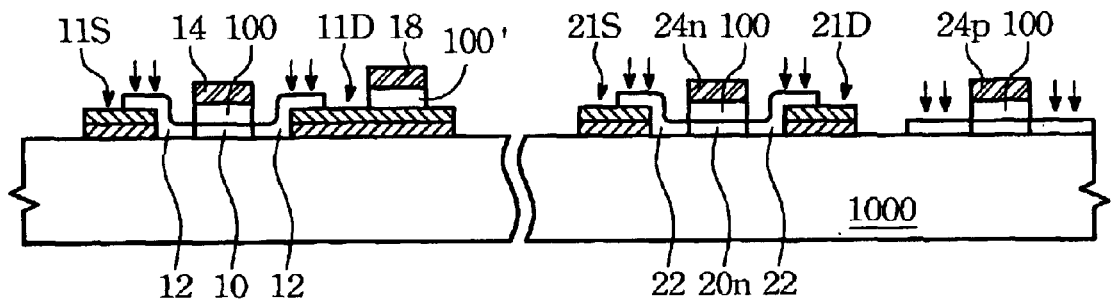
Figure 1D:
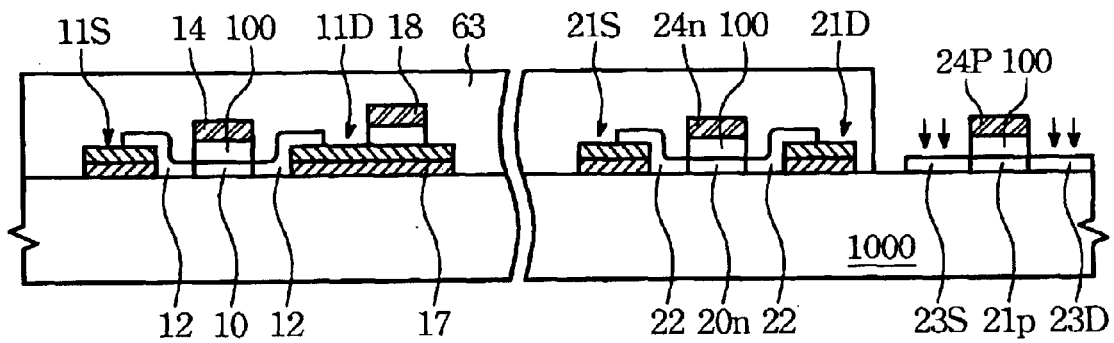
Figure 1E:
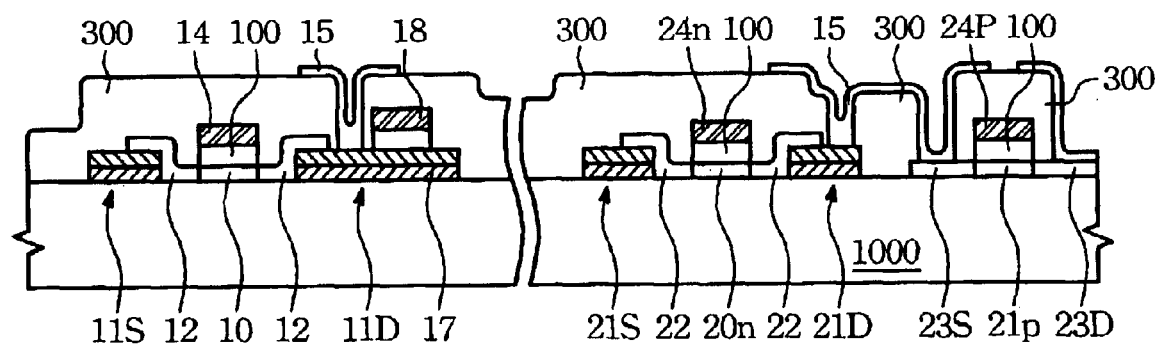
Figure 2A:
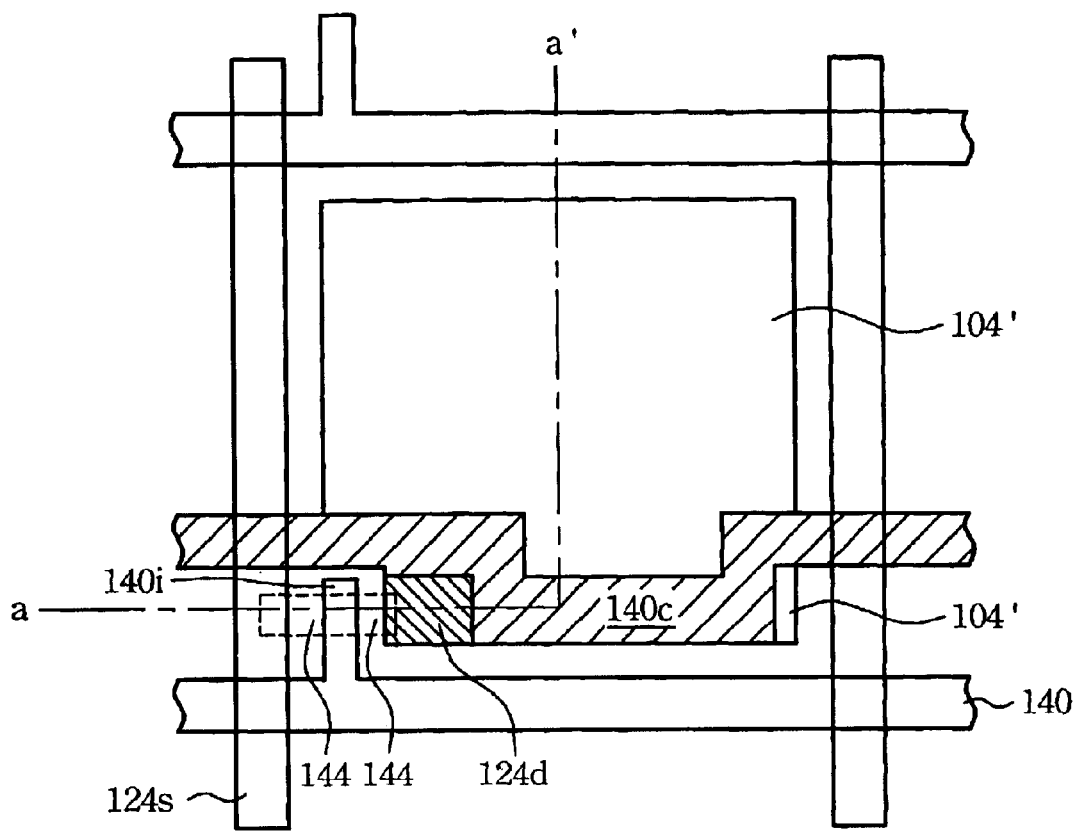
FIG. 2A is a top-view of one pixel of a TFT-LCD in accordance with the present invention.

The present invention is to use the least mask to fabricate the LCD device with driving circuit. Additional features and advantages of the invention will be set forth in the description which follows, Referring to FIG. 2A, shows a top view of a pixel element of a LCD panel according to the present invention. In figure, the scan line 140 cross to and perpendicular to the signal line 124s. The scan line 140 connects the gate electrodes 140i of the pixel TFTs arranged on one row. The signal line 124s connects the source electrodes of the pixel TFTs arranged on a column. The label 104 indicates a transparent conductive layer, which is indium tin oxide layer(ITO). The label 140c denotes a stored capacitor, which is connected to the drain electrode 124d by means of ITO 104.

Figure 2B:
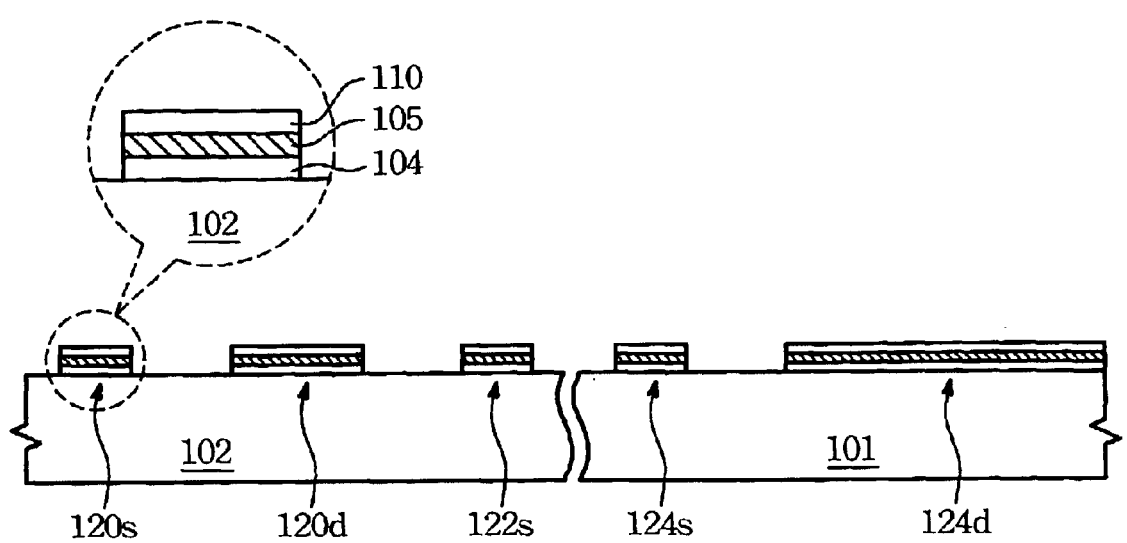
FIG. 2B to FIG. 2G are a series of cross-sectional views of fabricating processes for a TFT-LCD in accordance with the present invention, wherein the portion of pixel is along line a–a' of FIG. 2A.
Figure 2C:
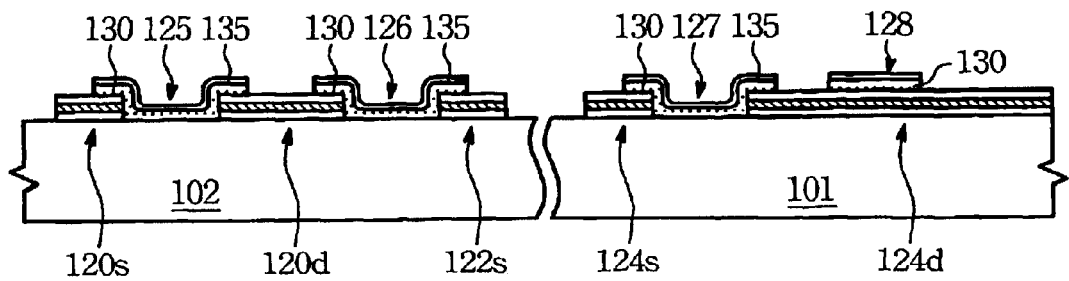

As to fabricating processes, please refer to following figures: FIG. 2B to FIG. 2C, which are cross-sectional views along a–a' of FIG. 2A.

Referring to FIG. 2B, a transparent conductive oxide layer 104, a metal layer 105 are sequentially formed on a transparent substrate, which is divided into drive circuit region 100, and pixel region 101. Afterward, an n+ conductive impurity doped silicon layer 110 is optionally deposited on the metal layer 105. The transparent conductive oxide layer 104 is an indium tin oxide layer (ITO) or a cadmium tin oxide layer. The n+ conductive impurity doped silicon layer 110 can be either a polysilicon layer or an amorphous layer by in-situ doped. Thereafter, a lithographic and an etching process are successively performed to form a source electrode 120s and a drain electrode 120d of n-type TFT and a source electrode of p-type electrode 122s on the drive circuit region 100. In addition, a source electrode 124s, a drain electrode 124d, and a preserved region for pixel capacitor and for storage capacitor are also defined on the pixel region 101.

Subsequently, referring to FIG. 2C, an un-doped amorphous layer 130 and gate oxide layer 135 are then deposited in order on the entire areas. Thereafter, a LASER crystallizing process is conducted to transfer all amorphous silicon layers to polysilicon layers. After that the un-doped polysilicon layer 130 and gate oxide layer 135 are patterned so as to define preserved regions 125, 126, 127, and 128, for n-type TFT, p-type TFT, pixel TFT, and storage capacitor, respectively. The preserved region 125 overlay a portion of the source electrode 120s and the drain electrode 120d. The preserved region 126 overlay a portion of the source electrode 122s and the drain electrode 120d. The preserved region 127 overlay a portion of the source electrode 124s and the drain electrode 124d.

Figure 2D:
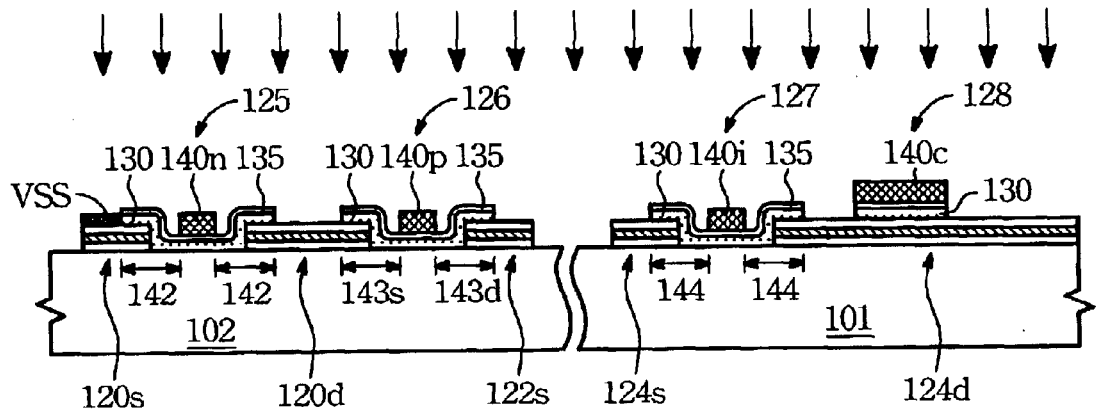

Referring to FIG. 2D, a metal layer is deposited on the entire areas. A patterning process is then carried out to form a gate electrode 140i of the pixel TFT and a top electrode 140c of the storage capacitor on the pixel region 101 as well as a reference electrode VSS and gate electrodes 140n, 140p of the n-type TFT and the p-type electrode, respectively, on the drive circuit region 100.

It is noted that the remnant region of the preserved regions 125 on the left hand side and right hand side of the gate electrode 140n are to preserve for forming LDD (lightly doped drain) regions 142. The remnant region of the preserved regions 127 are to form LDD regions 144. The remnant regions of the preserved regions 126 are to form a source electrode and a drain electrode of p-type TFT. Thereafter, an nLDD ion implant using n-type conductive impurities is implemented by using all gate electrodes as masks.

Figure 2E:
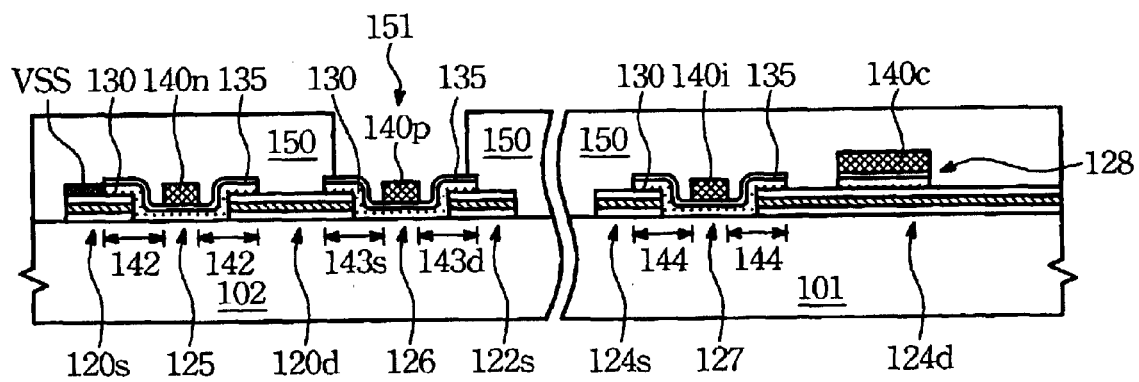

Referring to FIG. 2E, a first photoresist pattern 150 containing an opening 151 is coated on all areas. The opening 151 is to expose the preserved region 126. A heavily doped process with p-type conductive impurities is then performed to form a source region 143s and a drain region 143d of the p-type TFT.

Figure 2F:
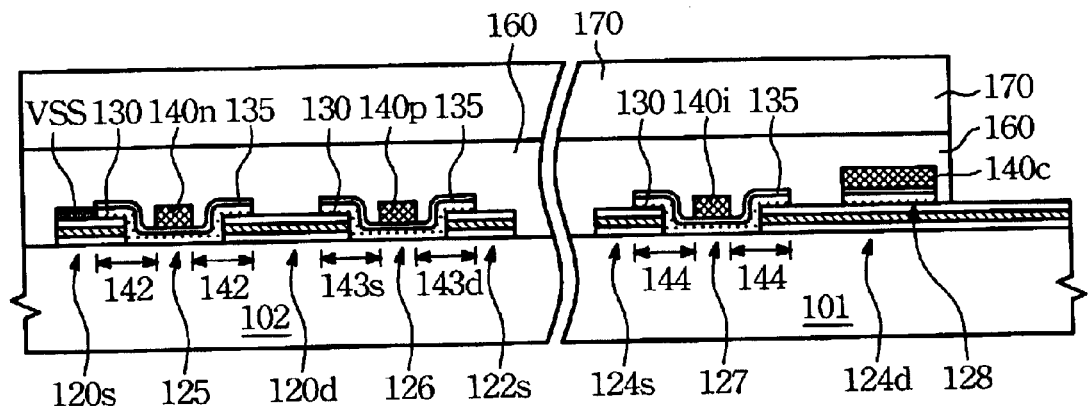

Referring to FIG. 2F, after stripping the photoresist 150, a passivation layer 160 is then coated on all surfaces. The passivation layer 160 is to flat the surface. The passivation layer 160 can be formed by a way selected from the following: (1) blanket forming a nitride layer; (2) forming a nitride layer firstly and then depositing an oxide layer; (3) forming a nitride layer and then forming a photosensitive resin layer. (4) forming a photosensitive resin layer.

To active the doped impurities, an anneal process is required. The anneal process can be done before or post the passivation layer formation. Preferably, the anneal process is performed in hydrogen ambient, which can cure those silicon dangling bonds during processes. In case of passivation layer made of photosensitive resin. The anneal process should be carried out before the photosensitive resin layer formation.

Figure 2G:
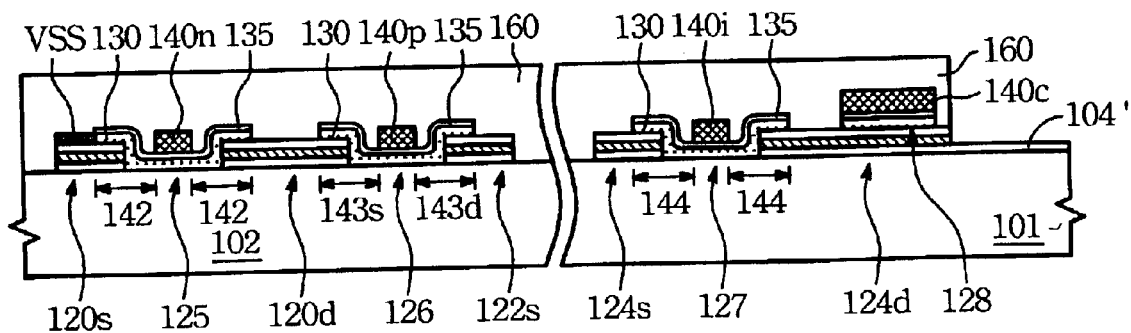

Referring to FIG. 2G, the passivation layer 160 is patterned to form contacts (not shown) on the end terminal of the panel of the LCD as well as to expose the ITO on the pixel capacitor. The process can be done by etching in terms of photoresist pattern layer 170 or a photosensitive resin pattern layer as a mask. The photosensitive resin layer needs an uV illuminating process to improve the transparency.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure

What is claimed is:

1. A method of fabricating liquid crystal display device with a pixel TFT, a bottom electrode of pixel capacitor, and a storage capacitor in a pixel region, and a first-conductive type TFT and a second-conductive type TFT in a driving circuit region, said method comprising the steps of:

providing a transparent substrate;

forming a transparent conductive oxide layer on said transparent substrate;

forming a first metal layer on said transparent conductive oxide layer;

first patterning said first metal layer and said transparent conductive oxide layer to form predefined regions for said first-conductive type TFT, and said second-conductive type TFT in said driving circuit region, and said pixel TFT, said pixel capacitor, said storage capacitor in said pixel region;

sequentially forming an active layer and a gate oxide layer on all areas;

patterning said gate oxide layer, and said active layer to form a first preserved region on said first-conductive type TFT predefined region prepared for a LDD region and a gate electrode, a second preserved region on said second-conductive type TFT predefined region prepared for a source, a drain and a gate electrode, a third preserved region on said pixel TFT predefined region prepared for a LDD region and a gate electrode, and forming a dielectric layer for said storage capacitor;

forming a gate metal layer on all areas;

patterning said gate metal layer to form a gate electrode of said first-conductive type TFT, a gate electrode of said second-conductive type TFT, a gate electrode of said pixel TFT and top capacitor electrode of said storage capacitor;

performing a LDD implantation by implanting impurities of said first-conductive type into said active layer, using all of said gate electrode as a hard mask;

forming a first photoresist pattern on all areas, wherein said first photoresist pattern has an opening to expose said second preserved region;

performing a second implantation by implanting impurities of said second-conductive type into said active layer to form said source region and said drain region of said second-conductive type TFT, using first photoresist pattern as a mask;

removing said first photoresist pattern forming a passivation layer on all areas;

patterning said passivation layer to remove said passivation layer on said pixel capacitor and forming contact holes for said driving region;

patterning a portion of said first metal layer to expose said transparent conductive oxide layer for said bottom electrode of said pixel capacitor.

2. The method according to claim 1, wherein said step of patterning said gate metal layer further comprises forming a power electrode and a reference electrode.

3. The method according to claim 1, wherein said first-conductive type TFT and said second-conductive type TFT have one electrode in common.

4. The method according to claim 1, further comprising a step of forming a heavy doped silicon layer on said first metal layer before said first patterning step.

5. The method according to claim 1, wherein said step of forming an active layer comprises steps of forming an un-doped amorphous layer and performing laser anneal to re-crystallize said amorphous layer.

6. The method according to claim 1, wherein said passivation layer is selected from the group consisting of a photosensitive layer, a silicon nitride layer, an oxide layer, and the combination thereof.

7. The method according to claim 6, further comprising an annealing step to active said impurities before forming said photosensitive layer or after forming said silicon nitride layer, or said oxide layer.

8. A method of fabricating liquid crystal display device with a pixel TFT, a bottom electrode of pixel capacitor, and a storage capacitor in a pixel region, and an n-type TFT and a p-type TFT in a driving circuit region, said method comprising the steps of:

providing a transparent substrate;

forming a transparent conductive oxide layer on said transparent substrate;

forming a first metal layer on said transparent conductive oxide layer;

forming an n-type heavy doped silicon layer;

first patterning said n-type heavy doped silicon layer, said first metal layer and said transparent conductive oxide layer to form predefined regions for said n type TFT, and said p type TFT in said driving circuit region, and said pixel TFT, said pixel capacitor, said storage capacitor in said pixel region;

sequentially forming an active layer and a gate oxide layer on all areas;

patterning said gate oxide layer, and said active layer to form a first preserved region on said n type TFT predefined region prepared for a LDD region and a gate electrode, a second preserved region on said p type TFT predefined region prepared for a source, a drain and a gate electrode, a third preserved region on said pixel TFT predefined region prepared for a LDD region and a gate electrode, and forming a dielectric layer for said storage capacitor, wherein said n type TFT predefined region and said p type TFT predefined region have an electrode in common;

forming a gate metal layer on all areas;

patterning said gate metal layer to form a gate electrode of said n type TFT, a gate electrode of said p type TFT, a gate electrode of said pixel TFT and top capacitor electrode of said storage capacitor;

performing a LDD implantation by implanting impurities of said n type into said active layer, using all of said gate electrode as a hard mask;

forming a first photoresist pattern on all areas, wherein said first photoresist pattern has an opening to expose said second preserved region;

performing a second implantation by implanting impurities of said p type into said active layer to form said source region and said drain region of said p type TFT, using first photoresist pattern as a mask removing said first photoresist pattern forming a passivation layer on all areas;

patterning said passivation layer to remove said passivation layer on said pixel capacitor and forming contact holes for said driving region;

patterning a portion of said first metal layer to expose said transparent conductive oxide layer for said bottom electrode of said pixel capacitor.

9. The method according to claim 8, wherein said step of patterning said gate metal layer further comprises forming a power electrode and a reference electrode.

10. The method according to claim 8, wherein said step of forming an active layer comprises steps of forming an un-doped amorphous layer and performing laser anneal to re-crystallize said amorphous layer.

11. The method according to claim 8, wherein said passivation layer is selected from the group consisting of a photosensitive layer, a silicon nitride layer, an oxide layer, and the combination thereof.

12. The method according to claim 11, further comprising an annealing step to active said impurities before forming said photosensitive layer or after forming said silicon nitride layer, or said oxide layer.

* * * * *